(12) United States Patent
Marlia et al.

(10) Patent No.: US 9,647,587 B2
(45) Date of Patent: May 9, 2017

(54) SYSTEM AND METHOD FOR DETERMINING THE POSITION OF A MOVING PART DRIVEN BY AN ELECTRIC MOTOR

(71) Applicant: Magna Closures S.p.A., Guasticce (Livorno) (IT)

(72) Inventors: Marco Marlia, Guasticce Collesalvetti (IT); Marco Bartalucci, Castelfranco di Sotto (IT)

(73) Assignee: MAGNA CLOSURES S.p.A., Guasticce (Livorno) (IT)

(*) Notice: Subject to any disclaimer, the term of this patent is extended or adjusted under 35 U.S.C. 154(b) by 0 days.

(21) Appl. No.: 14/729,646

(22) Filed: Jun. 3, 2015

(65) Prior Publication Data

US 2015/0357949 A1 Dec. 10, 2015

(30) Foreign Application Priority Data

Jun. 9, 2014 (IT) .............................. TO2014A0463

(51) Int. Cl.
| | | |
|---|---|---|
| *H02P 3/00* | (2006.01) | |
| *H02P 7/18* | (2006.01) | |
| *G05B 19/4061* | (2006.01) | |
| *H02P 7/03* | (2016.01) | |

(52) U.S. Cl.
CPC ............ *H02P 7/18* (2013.01); *G05B 19/4061* (2013.01); *H02P 7/04* (2016.02); *G05B 2219/37094* (2013.01); *G05B 2219/49159* (2013.01)

(58) Field of Classification Search
CPC ..................................... H02P 3/00; H02P 6/00

USPC .... 318/560, 400.01, 400.14, 400.15, 400.32, 318/400.4, 700, 701, 721, 779, 799, 801, 318/430, 432, 266, 280, 466, 727; 388/800
See application file for complete search history.

(56) References Cited

U.S. PATENT DOCUMENTS

| | | | |
|---|---|---|---|
| 5,432,421 A | 7/1995 | Kessler et al. | |
| 5,434,487 A * | 7/1995 | Long ..................... | E05F 15/75 318/280 |
| 5,521,474 A * | 5/1996 | Hahn ................... | H02H 7/0851 318/266 |
| 5,523,679 A | 6/1996 | Kalb | |
| 5,689,160 A | 11/1997 | Shigematsu et al. | |
| 5,734,245 A | 3/1998 | Terashima et al. | |
| 5,780,988 A * | 7/1998 | Kalb ..................... | B60J 7/0573 318/87 |
| 6,051,945 A | 4/2000 | Furukawa | |

(Continued)

FOREIGN PATENT DOCUMENTS

EP         0603506 B1    1/1998

*Primary Examiner* — Antony M Paul
(74) *Attorney, Agent, or Firm* — Dickinson Wright PLLC

(57) ABSTRACT

A system for determining the position of a moving part driven by an electric motor: a single position sensor, coupled to the electric motor, incrementally detects an amount of movement thereof; a direction switching arrangement controls a direction of movement of the electric motor; and a control unit, coupled to the single position sensor and the direction switching arrangement, at each incremental amount of movement detected by the single position sensor, determines a current position of the moving part based on a previous position thereof and the current direction of movement controlled by the direction switching arrangement.

17 Claims, 6 Drawing Sheets

(56) References Cited

U.S. PATENT DOCUMENTS

| | | | |
|---|---|---|---|
| 6,163,123 A * | 12/2000 | Nagai | G05B 19/40 |
| | | | 318/560 |
| 6,552,506 B2 | 4/2003 | Kramer et al. | |
| 6,624,603 B2 | 9/2003 | Preymann | |
| 7,770,327 B2 * | 8/2010 | Noro | E05F 15/695 |
| | | | 318/432 |
| 7,814,704 B2 * | 10/2010 | Suzuki | E05F 15/41 |
| | | | 296/155 |
| 8,412,403 B2 | 4/2013 | Köllner et al. | |

* cited by examiner

SYSTEM AND METHOD FOR DETERMINING THE POSITION OF A MOVING PART DRIVEN BY AN ELECTRIC MOTOR

CROSS-REFERENCE TO RELATED APPLICATIONS

This application claims the benefit and priority of Italian Patent Application No. TO2014A000463 filed Jun. 9, 2014. The entire disclosure of the above application is incorporated herein by reference.

FIELD

The present invention relates to a system and to a method for determining the position of a moving part driven by an electric motor; in particular, the following description will make explicit reference, without this implying any loss in generality, to the use of the system and method in relation to an automotive power actuator, such as a window regulator for a motor-vehicle window, sunroof or similar.

BACKGROUND

This section provides background information that is not necessarily prior art.

Electric motors, in particular of the rotary type, are widely used to drive moving parts, in particular in two opposite directions, by inversion of the polarity of supply signals provided thereto.

For example, in a motor vehicle, electric motors are used in window regulators to drive a vehicle window (or sunroof, or similar element) along two, generally linear, opposite directions, i.e. an opening and a closing direction. Generally, the rotation of a shaft of the electric motor is transformed into a linear movement of the moving part, via a suitable coupling arrangement; therefore, a movement of the moving part corresponds to a rotation of the electric motor, with a given coupling ratio.

A system for determining the position of the moving part driven by the electric motor is required in order to control the movement (e.g. in order to implement a feedback control action); in particular, in case of a motor vehicle window regulator, the control action also has to provide safety features, such as a quick reaction to events that could cause harm to a vehicle passenger (so called anti-pinch feature).

Known position determining systems include incremental position sensors coupled to the electric motor, e.g. magnetic Hall sensors coupled to a shaft of the electric motor, in order to determine an incremental change of position of the moving part (with respect to a previous position), based on the sensed rotation of the electric motor.

The present Applicant has realized that there are at least certain operating conditions, for which determining the position of the moving part driven by the electric motor may prove a difficult task.

In particular, when an electric motor receives a command to stop or reverse its movement, e.g. its rotation, the same electric motor may continue its motion for a certain amount of time, due to the momentum of the driven part coupled thereto. Moreover, it may happen that a mechanical stall of the electric motor causes its motion in a reverse direction with respect to a previous direction of movement.

In order to at least partially cope with these difficulties, known solutions generally envisage use of two or more position sensors coupled to the electric motor, at spaced apart locations, in order to determine its movements in the two opposite directions. In particular, a phase difference between impulses detected by the sensors may be used as an indication of the direction of movement.

However, these systems are quite complex and expensive to manufacture, and arrangement of the two or more position sensors may prove to be critical in certain applications, such as in automotive applications, due to size and costs requirements.

SUMMARY

This section provides a general summary of the present disclosure and is not intended to be interpreted as a comprehensive listing of its full scope and/or all of its aspects, objectives and features.

It is thus an object of certain aspects of the present invention to provide a simple, but at the same time reliable solution, for determining the position of a moving part driven by an electric motor.

This object can be achieved by a system and method, as defined in the appended claims.

In this regard, it is the object of the present disclosure to provide a system for determining the position of a moving part driven by an electric motor. The system comprises: a single position sensor coupled to the electric motor and configured to detect an incremental amount of movement thereof; a direction switching arrangement configured to control a current direction of movement of the electric motor; and a control unit coupled to the single position sensor and the direction switching arrangement and configured, at east incremental amount of movement detected by the single position sensor, to determine a current position of the moving part based on a previous position thereof and the current direction of movement controlled by the direction switching arrangement.

Furthermore, it is an object of the present disclosure to provide a method for determining the position of a moving part driven by an electric motor. The method comprises: incrementally detecting an amount of movement of the electric motor by a single position sensor coupled thereto;

Providing an indication related to a current direction of movement of the electric motor, based on an operating status of a direction switching arrangement, configured to control a direction of movement of the electric motor; and at each incremental amount of movement detected by the single position sensor, determining a current position of the moving part based on a previous position thereof and the current direction of movement controlled by the direction switching arrangement.

DRAWINGS

A preferred, non-limiting embodiment of certain aspects of the present invention will be described by way of example with reference to the accompanying drawings, in which.

DESCRIPTION

Figure 1:
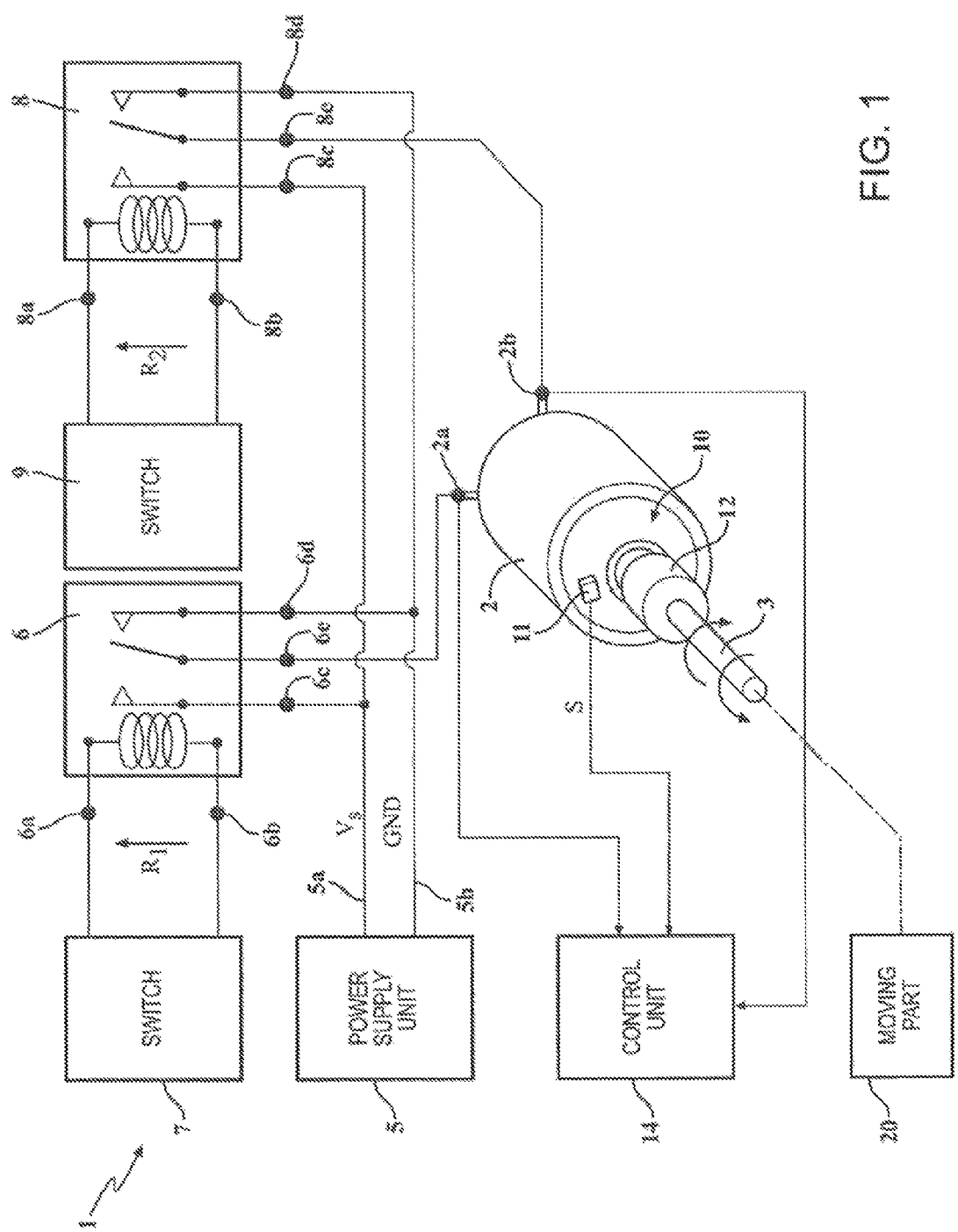
FIG. 1 is a schematic block diagram of a position determining system coupled to an electric motor, according to an embodiment of the present solution.

With reference to FIG. 1, a system, denoted as a whole with 1, is now described, for determining the position of a moving part 20, driven by an electric motor 2.

In a known manner, here not discussed in detail, electric motor 2 includes a rotor, operable to rotate with respect to a stator.

In the example shown, electric motor 2 is of the rotary type and is coupled to a shaft 3, which in turn is coupled to the moving part 20, via a suitable arrangement for movement transformation (of a known type, here not shown).

Electric motor 2 is operable to rotate the shaft 3 in a first direction, e.g. clockwise, and in a second opposite direction, e.g. anti-clockwise, via application of power supply signals with respective, reversed, polarities.

In particular, electric motor 2 has a first and a second supply input terminal 2a, 2b, which are designed to be coupled to a power supply unit 5, having a first supply output terminal 5a, providing a positive power supply signal $V_s$, e.g. equal to +12 V, and a second supply output terminal 5b, providing a reference ground potential GND (or a negative power supply signal).

A switching arrangement is coupled to the electric motor and is operable to control a direction of movement thereof.

In particular, a first controlled switching element 6, in particular a relay, in the example shown of the electromagnetic type, couples the first supply input terminal 2a of the electric motor 2 to the power supply unit 5. The first controlled switching element 6 receives at its input a first control signal $R_1$, e.g. between a first and a second control input terminal 6a, 6b; the first control signal $R_1$ is for example provided as a function of a user actuation on a first switch element 7 (e.g. in the form of a push button, a lever or similar actuatable element).

A second controlled switching element 8, in particular a relay, in the example shown of the electromagnetic type, couples the second supply input terminal 2b of the electric motor 2 to the power supply unit 5. The second controlled switching element 8 receives at its input a second control signal $R_2$, e.g. between a first and a second control input terminal 8a, 8b; the second control signal $R_2$ is for example provided as a function of a user actuation on a second switch element 9, which is alternative to actuation of the first switch 7.

In an alternative solution, both the first and the second control signal $R_2$ may be the result of the actuation of a same switch, e.g. in different directions thereof.

Also, first and second control signals $R_1$, $R_2$ may instead be provided by an external control unit (here not shown, for example a main control unit of a vehicle in which the system 1 is used), for example as a function of user actuation on the first and second controlled switching elements 6, 8.

Moreover, activation of controlled switching elements 6, 8 may also occur independently from user activation of the respective switches 7, 9; for example, in case of a window regulator implementing an anti-pinch feature, a control unit may actively stop providing energy to the electric motor 2 in a requested direction, and possibly provide energy in the opposite direction, when an obstacle, or an obstruction is sensed, by an anti-pinch system in the path of the window in the given direction (in a known manner, here not discussed in detail).

When the first controlled switching element 6 is engaged, or activated (and the second controlled switching element 8 is not engaged, or deactivated), the first controlled switching element 6 connects the first supply input terminal 2a to the first supply output terminal 5a, providing thereto the positive supply signal $V_s$; and the second controlled switching element 8 connects the second supply input terminal 2b to the second supply output terminal 5b, at the reference ground potential GND.

Likewise, when the first controlled switching element 6 is not engaged (and the second controlled switching element 8 is engaged), the first controlled switching element 6 connects the first power supply terminal 2a to the reference ground potential GND; and the second controlled switching element 8 connects the second power supply terminal 2b to the first output terminal 5a, providing thereto the positive supply signal $V_s$.

When a motor stop command is issued via the switches 7, 9, or by the control unit, the supply input terminals 2a, 2b of the electric motor 2 are electrically shorted by deactivation of both controlled switching elements 6, 8, thereby braking the same electric motor 2.

The switching arrangement including the first and second controlled switching elements 6, 8 therefore allows for inversion of the polarity of power supply signals provided to the electric motor 2, and stopping of the same electric motor 2; moreover, operation of the same switching arrangement is indicative of the direction of movement of the electric motor 2.

In more detail, in the exemplary embodiment shown in FIG. 1, the first controlled switching element 6 has a first and a second side terminal 6c, 6d, respectively connected to the first and second supply output terminals 5a, 5b, and a central terminal 6e connected to the first supply input terminal 2a. The central terminal 6e is normally electrically shorted to the second side terminal 6d, thereby shorting the path between the second supply output terminal 5b and the first supply input terminal 2a. When the first controlled switching element 6 is engaged, the central terminal 6e switches (e.g. due to electromagnetic attraction, as schematically shown in the same FIG. 1) to the first side terminal 6c, thereby shorting the path between the first supply output terminal 5a and the first supply input terminal 2a.

Likewise, the second controlled switching element 8 has a first and a second side terminal 8c, 8d, respectively connected to the first and second supply output terminal 5a, 5b, and a central terminal 8e connected to the second supply input terminal 2b. The central terminal 8e is normally electrically shorted to the second side terminal 8d, thereby shorting the path between the second supply output terminal 5b and the second supply input terminal 2b. When the second controlled switching element 8 is engaged, the central terminal 8e switches (e.g. due to electromagnetic attraction) to the first side terminal 8c, thereby shorting the path between the first supply output terminal 5a and the second supply input terminal 2b.

According to an aspect of the present solution, position determining system 1 includes a single position sensor unit 10, coupled to the electric motor 2, in order to incrementally detect the amount of rotation thereof.

In particular, position sensor unit 10 includes an incremental position sensor 11; in a possible embodiment, position sensor unit 10 includes a magnetic Hall sensor coupled to a fixed, stator body of the electric motor 2, and cooperating with a magnet ring 12 mounted about the shaft 3 of the same electric motor 2. The position sensor 11 determines an incremental change of position of the electric motor 2 with respect to a previous position, this incremental change being positive, or negative, depending on the direction of movement of the electric motor 2.

Figure 2:
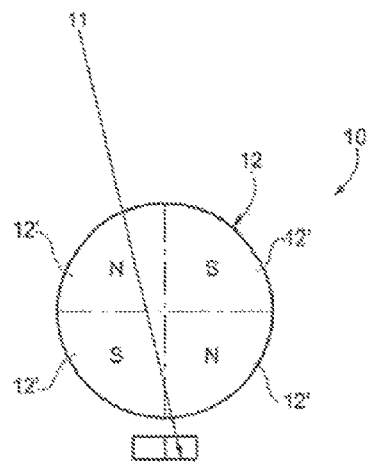
FIG. 2 is a schematic representation of a magnetic position sensor in the position determining system of FIG. 1, according to an aspect of the present solution.

As shown in FIG. 2, magnet ring 12 includes a number of pole sections 12' with alternating polarities (N, S); in the example shown, two pairs of radial pole sections 12' are shown.

Figure 3:
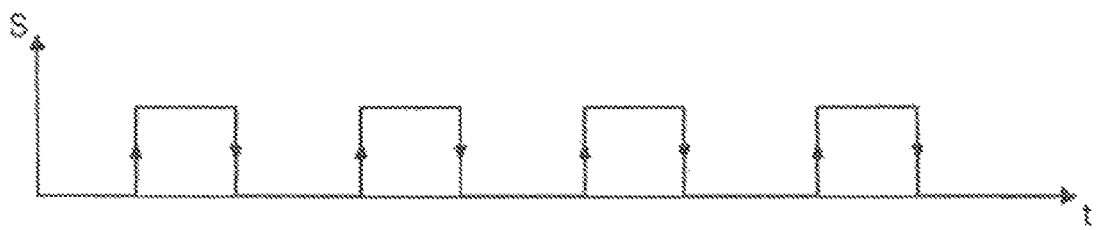
FIG. 3 is a schematic block diagram of a control unit of the position determining system of FIG. 1, according to an aspect of the present solution.

During rotation of the shaft 3, position sensor 11 outputs a sensing signal S (FIG. 1) including a number of rectangular pulses, as shown in FIG. 3. Each rising, or falling, edge of the pulses of the sensing signal S corresponds to a transition between opposite pole sections 12' of the magnet ring 12, and thereby corresponds to an elementary rotation of the electric motor 2 (to which in turn corresponds a related change of position of the moving part 20 driven by the same electric motor 2).

Position determining system 1 further includes a control unit 14 (shown in FIG. 1), which is configured to determine the position of moving part 20 based on the incremental position information associated to the sensing signal S, and also based on the status of the first and second controlled switching elements 6, 8 (and the associated first and second control signals $R_1$, $R_2$), the latter being indicative of a rotation direction for the electric motor 2.

Figure 4:
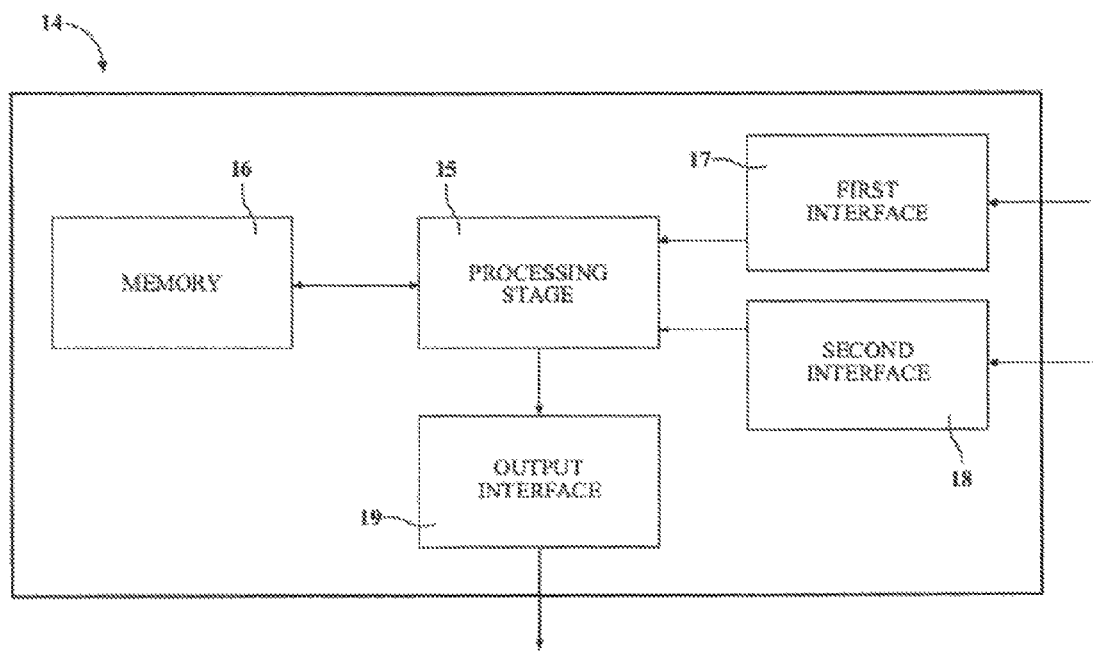
FIGS. 4 and 5 show plots of electrical quantities in the position determining system of FIG. 1.

In detail, and as shown in FIG. 4, the control unit 14 includes: a processing stage 15, e.g. including a microprocessor, a microcontroller, an FPGA (Field Programmable Gate Array) or similar processing unit; a memory 16, e.g. a non volatile RAM memory, coupled to the processing stage 15; a first interface 17 (which may be distinct to, or integrated in the processing stage 15), coupled to the processing stage 15 and to the position sensor unit 10 and configured to acquire sensing signal S; a second interface 18 (which may be distinct to, or integrated in the processing stage 15), coupled to the processing stage 15 and configured to acquire status information about the activation of the first and second controlled switching elements 6, 8; and an output interface 19, coupled to the processing stage 15 and to an external processing device (not shown, e.g. a control unit of the vehicle in which position determining system 1 is used).

In a possible embodiment, as shown in FIG. 1, control unit 14 (in particular, the second interface 18 thereof) is electrically coupled to the first and second supply input terminals 2a, 2b of the electric motor 2, and is configured to determine the status information about activation of the first and second controlled switching elements 6, 8 based on a voltage present on the same supply input terminals 2a, 2b. However, it is clear that other solutions may be envisaged: for example, second interface 18 may be coupled to the control input terminals 6a, 6b, and 8a, 8b of the controlled switching elements 6, 8 (or to control outputs of the external control unit generating control signals $R_1$, $R_2$), in order to acquire the first and second control signals $R_1$, $R_2$, or information associated thereto (in any case indicative of the rotation direction of electric motor 2).

In particular, activation of the first controlled switch 6 corresponds to a first direction of movement for moving part 20 (for example a rising, or UP, movement of a window, in case of a window regulator); while activation of the second controlled switch 8 corresponds to a second direction of movement of the same moving part 20 (for example a falling, or DOWN, movement of the window, in case of the window regulator).

During operation, processing stage 15 of control unit 14 acquires the sensing signal S from position sensor 11, and is configured to process the same sensing signal S to detect the rising and/or falling edges of the pulses thereof.

Figure 5:
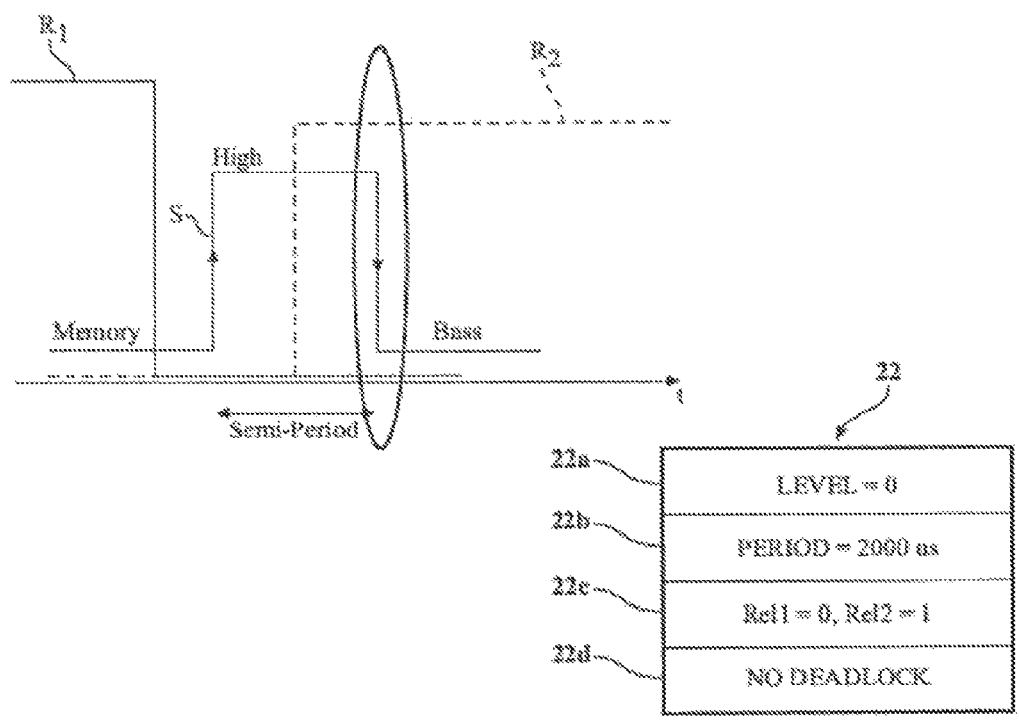

For each detected rising and/or falling edge, as schematically shown in FIG. 5, corresponding to a transition between opposite pole sections 12' of the magnet ring 12 of position sensor unit 10, processing stage 15 generates a corresponding record or data structure, denoted with 22 in the same FIG. 5.

Data structure 22 includes: a first field 22a, where the digital level (high or low) of the sensing signal S (resulting from the transition) is recorded; a second field 22b, where the time elapsed from a previous detected edge (so called period, or semi-period) is recorded, this being indicative of a duration of the pulse and thus of a rotation speed of the electric motor 2 (and correspondingly of a movement speed for the moving part 20); a third field 22c, where the status of the controlled switching elements 6, 8 is recorded, e.g. in the form of a digital information ('0' representing a deactivated state, and '1' representing an activated state); and a fourth field 22d, where a stall condition information is stored.

In particular, in a known manner, a stall (or mechanical block) condition for the electric motor 2 is a condition in which the same electric motor 2, although energized via activation of the controlled switching elements 6, 8, does not produce a rotation output.

Processing stage 15 of control unit 14 may be configured to detect occurrence of a stall condition, when no pulses are received from the position sensor 11 over a given period of time, for example in the range of 0.1 to 1 s, during which at least one of the controlled switching elements 6, 8 is engaged.

A specific task is therefore executed by processing stage 15 to detect occurrence of the stall condition of electric motor 2, based on the status information on activation of the controlled switching elements 6, 8 and on the position information provided by the position sensor 11.

Data structures 22 are stored in memory 16, e.g. in the form of a buffer, and processing stage 15 is configured to execute a processing task at a given processing frequency, e.g. every 2 ms, in order to track the position of the moving part 20 driven by electric motor 2.

Processing of data structures 22 is based on a processing algorithm, which will now be discussed with reference to FIG. 6.

In general, this algorithm envisages incrementing a position count (associated to the pulses in the sensing signal S) in the direction of the activated controlled switching element 6, 8.

The position of the moving part 20 is directly correlated to the position count, and thus the position of the moving part 20 is determined, at any time, from the same position count.

Until the controlled switching element 6,8 continues to be active in the same direction, the position count continues to be incremented, or decremented, with respect to a previous value, according to the motor activation direction.

Moreover, a last-direction variable (i.e. a location in memory 16) is each time updated to the direction of rotation of the electric motor 2 (corresponding to the activated controlled switching element 6, 8).

As previously discussed, it is possible that the moving part 20 moves even when the electric motor 2 is not powered, continuing its motion after the same electric motor 2 is stopped, in the same direction (in case of normal, or electrical, stop), or in the reverse direction of last motor activation (in case of stall, or mechanical block).

Therefore, according to the algorithm, when the movement of the electric motor 2 is stopped, the pulses in the sensing signal S are counted in the same direction of the previous motor movement if the electric motor 2 is not stopped due to a stall condition (indeed, it is assumed that the moving part 2 continues its motion, due to its momentum).

If the motor is stopped in a stall condition, the pulses in the sensing signal S after motor stop are instead counted in the reverse direction with respect to the last motor activation (indeed, it is assumed that, due to the stall condition, a reversal of the rotation direction of the electric motor 2 occurs).

In each case, the last direction of movement may be determined based on the content of the last-direction variable, and the position count is incremented accordingly in that direction.

Moreover, the algorithm properly takes into account, when determining the position count, also the activation of an anti-pinch function, which causes reversal of the motion of the moving part 20 when an obstruction is detected along its path of movement.

Figure 6:
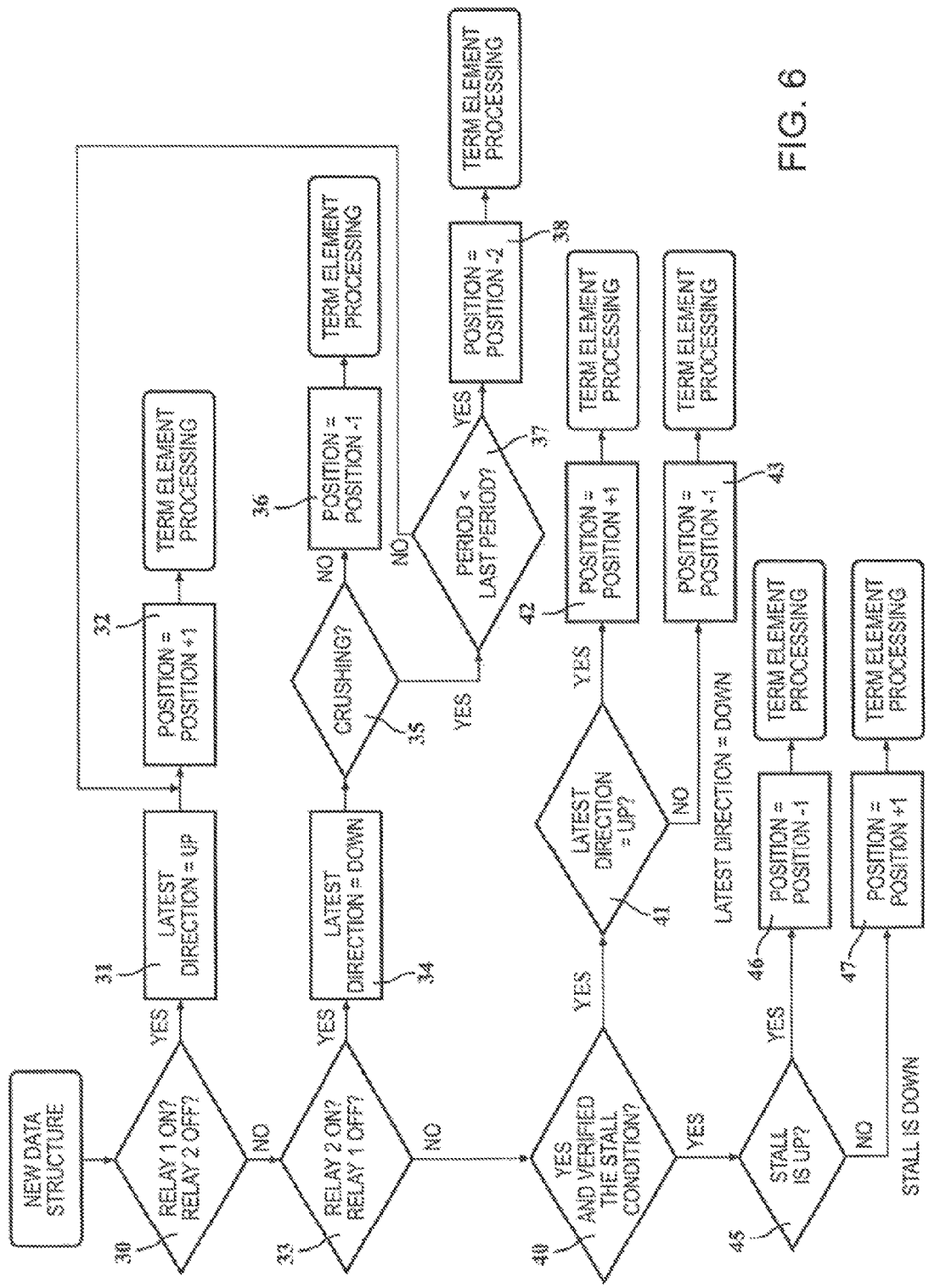
FIG. 6 is a flow chart of control operations performed by the control unit of FIG. 2.

In more details, and with specific reference to FIG. 6, processing task on each data structure 22 executed by the processing stage 15 of control unit 14 envisages, in a first block 30, determining whether the first controlled switch element 6 (Relay 1) is activated, and the second controlled switch element 8 (Relay 2) is not activated.

If this is the case, a moving direction of the moving part 20 is determined to be a first direction of movement (for example corresponding to an UP direction), and the last-direction variable is updated, at block 31, to the first direction of movement.

Moreover, position count is incremented, at block 32, and task processing ends.

If, at block 30, it is determined that the first controlled switch element 6 is not activated, the algorithm proceeds to block 33, where a determination is made, whether the second controlled switch element 8 is activated.

If this is the case, the moving direction of the moving part 20 is determined to be a second direction of movement (for example corresponding to a DOWN direction), and the last-direction variable is updated, at block 34, to the second direction of movement.

The algorithm then proceeds to block 35, where it is checked if a pinch (or, in general, an obstruction) event has occurred and has been detected; in a known manner, the pinch condition may be determined by the control unit 14 based on an excessive current drawn from the power supply by electric motor 2, or by suitable force sensor or other kind of sensors coupled to the moving part 20, and determines a reversal of movement of the moving part 20 (from an UP to a DOWN direction).

If no pinch is detected, then position count is decremented, at block 36, and task processing ends.

If instead, at block 35, a pinch condition is detected, the algorithm proceeds to block 37, where it is checked if the period value for the current data structure 22 (stored in the second field 22b thereof) is not lower than the period value of a last data structure 22 analyzed (which may also conveniently be stored in memory 16).

Indeed, due to the detected obstruction, a reversal of motion of the electric motor 2 is controlled, which may cause a lengthening of the detected pulse (due to detection of a first forward incremental amount movement, followed by a second reverse incremental amount of movement).

If this is the case, movement of the moving part 20 is thus still determined to be in the first direction (although the electric command has been provided, the electric motor 2 has not reversed yet its motion) and the algorithm proceeds back to step 32, where the position count is incremented; then, the current task processing ends.

If the period value for the current data structure 22 is instead determined to be lower than the period value of a last data structure 22, at block 37, then it is determined that the moving part 20 has indeed reversed its motion, and therefore the position count is decremented twice, at block 38, in order to take into account also the reverse amount of movement occurred during the previous pulse (the one having a longer duration).

The pinch event is thus considered to have been taken into account, and the further steps of the algorithm will then consider this pinch event resolved (e.g. a pinch flag stored in memory 16, which was previously activated upon detection of the obstruction, is deactivated).

Returning now at block 33, if it is determined that both the first and the second controlled switch elements 6, 8 are not activated, the algorithm proceeds to block 40, where it is checked if a stall condition has occurred and has been detected (again, a stall flag indicative of the stall event may be envisaged).

If a stall condition has not occurred, in block 41, a normal stopping condition is determined for the electric motor 2 and the last direction stored in the last-direction variable is then checked.

In case the last direction corresponds to the first direction of movement, position count is incremented, at block 42, and task processing ends.

In case the last direction instead corresponds to the second direction of movement, position count is decremented, at block 43, and task processing ends (in any case, upon normal stopping, position count is varied in a way conformal to the direction of movement).

If, at block 40, it is instead determined that the stall condition has occurred, the algorithm proceeds to block 45, where the last direction of movement (when stall occurred) is checked.

If the last direction corresponds to the first direction of movement, then the position count is decremented, at block 46, and task processing ends.

If, instead, the last direction corresponds to the second direction of movement, then the position count is incremented, at block 47, and again task processing ends (in any case, if the stall condition occurs, position count is varied in a way that is opposite to the direction of movement).

As previously discussed, the present solution may find advantageous application within a vehicle, for example in a window regulator thereof.

Figure 7:
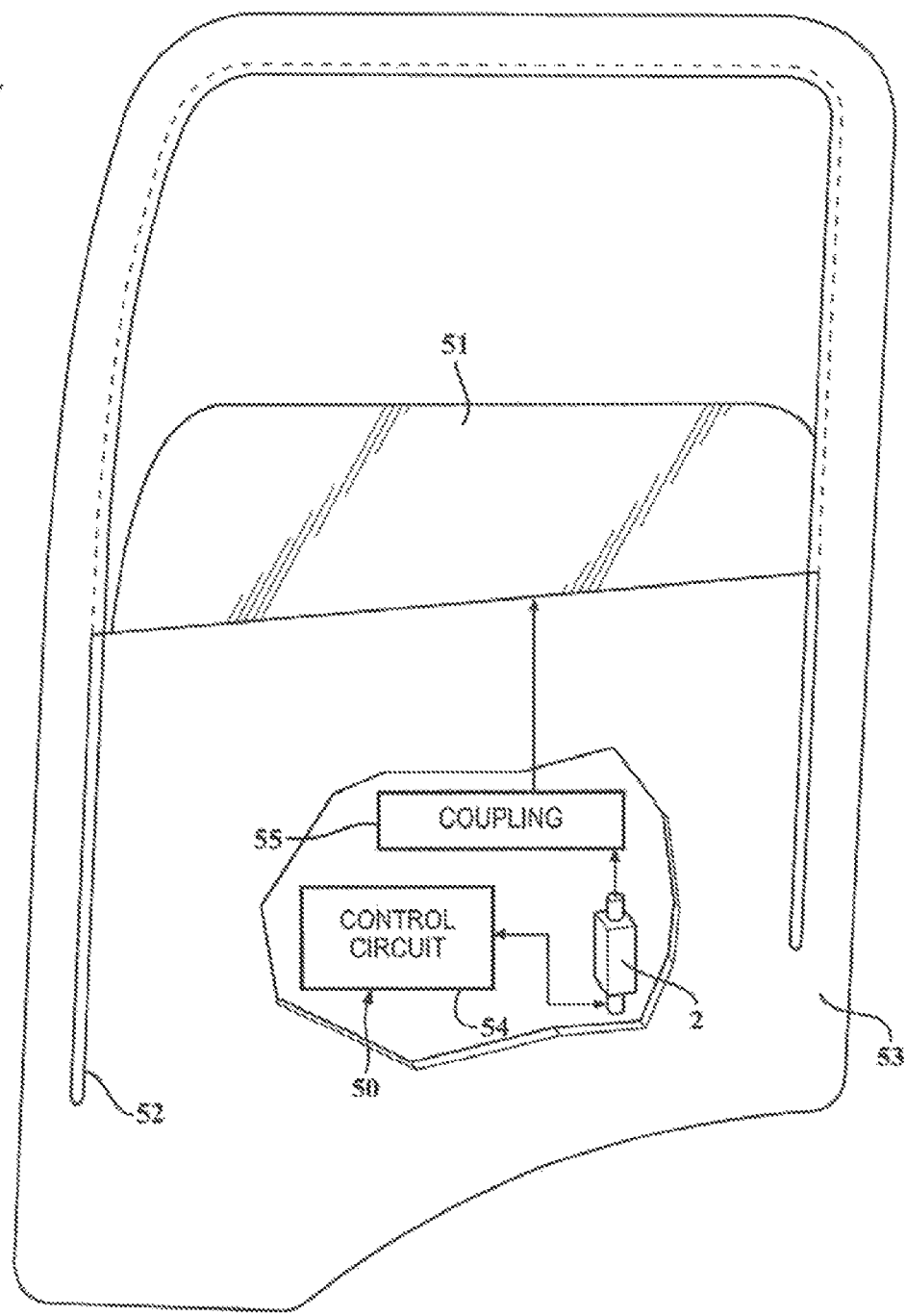
FIG. 7 is a block diagram of a motor-vehicle window regulator, in which the position determining system may be applied.

In this regard, FIG. 7 shows a window regulator 50, operable for driving a slider pane or window 51 between open and closed positions with respect to a supporting frame 52, fixed to a vehicle door 53.

Window regulator 50 includes an electric motor, denoted again with 2, and a control circuit 54, electrically coupled to the electric motor 2, and including suitable hardware and/or software to control the operation of the same electric motor 2; in particular, control circuit 54 includes the position determining system 1, for determining the position of window 51 (and in particular the related control unit 14).

Window regulator 50 further includes a mechanical coupling assembly 55 (shown schematically), including e.g.

rotating output shafts, gear trains and/or reduction gear trains, coupling the electric motor 2 to the window 51, so as to cause its movement with respect to the supporting frame 52.

Figure 8:
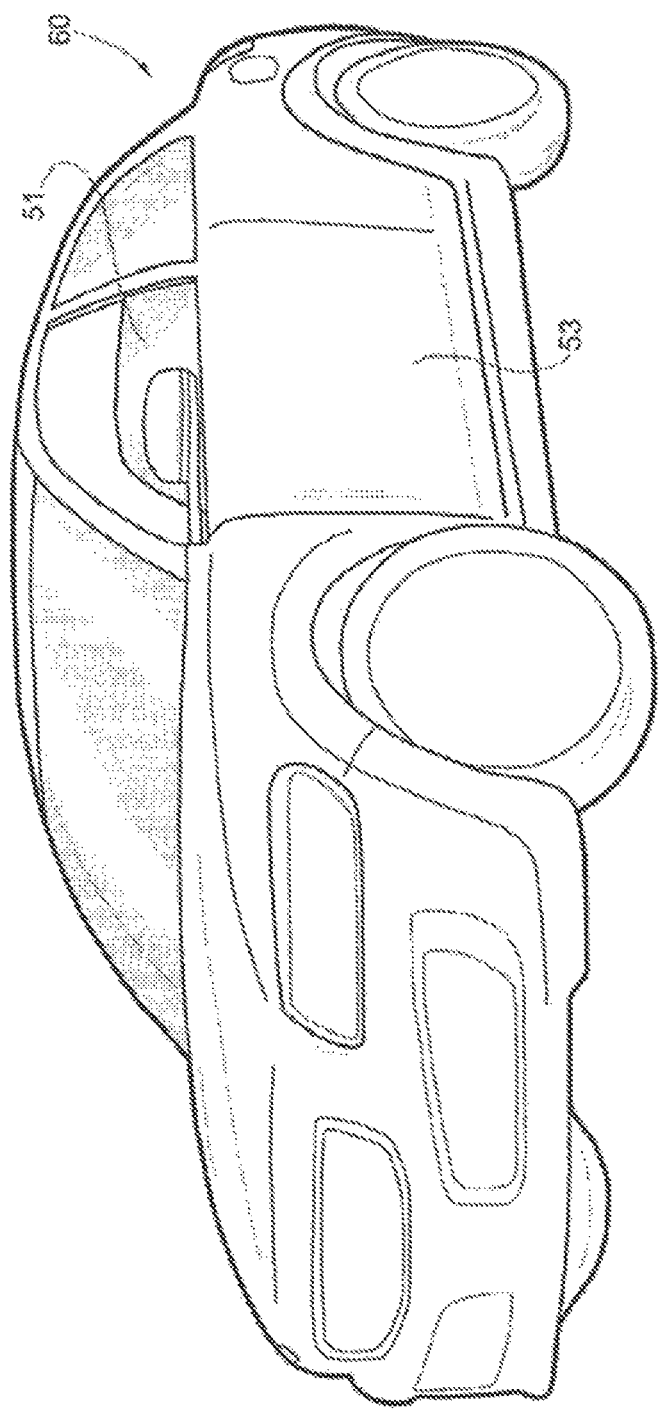
FIG. 8 is a schematic view of a motor vehicle, in which the window regulator of FIG. 7 may be mounted.

FIG. 8 shows a vehicle 60, where the window regulator (here not shown) may be mounted, for example to control actuation of window 51 of door 53.

The advantages of the discussed solution are clear from the foregoing description.

In particular, it is underlined that this solution allows to reliably track and determine the position of a moving part 20 driven by an electric motor 2, efficiently coping with critical operating conditions, such as reversal of direction of movement (e.g. due to an anti-pinch function), electrical and/or mechanical block of the electric motor 2, in particular a stall thereof.

Moreover, the discussed system 1 envisages use of very few components, in particular a single incremental position sensor 10 (e.g. a Hall sensor).

No relevant changes are thus to be made to existing devices, for example to a window regulator, in which position determining system 1 may be used, even in case of retrofitting or upgrade operations. Indeed, position determining system 1 mainly uses components (such as the controlled switch elements 6, 8), which may already be present in such devices.

Clearly, changes may be made to what is described and illustrated herein without, however, departing from the scope of the present invention, as defined in the accompanying claims.

In particular, it is underlined that other types of position sensors may be used to sense the rotation of the electric motor 2, different from a magnetic Hall sensor, for example an optical sensor, an inductive or a capacitive sensor, a contact position sensor.

Moreover, other types of controlled switching elements, different from relays, may be used to control operation of the electric motor 2, and any other suitable means may be used in order to detect the direction of rotation of the same electric motor 2; for example, other switching semiconductor transistor devices, like MOSFET or BJT controlled switches could be used in the switching arrangement coupled to the electric motor 2.

It is also clear that the discussed system and method may be used advantageously with other automotive power actuators in a motor vehicle, different from the window regulator discussed in the preferred embodiment; for example, the solution may be used for a boot compartment, a sliding door or a sunroof of the vehicle.

The invention claimed is:

1. A system for determining the position of a moving part driven by an electric motor, comprising:
    a single position sensor coupled to the electric motor and configured to detect an incremental amount of movement thereof;
    a direction switching arrangement configured to control a current direction of movement of the electric motor and including first and second controlled switching elements, wherein the first controlled switching element is operable, when activated, to couple the electric motor to a power supply so that the electric motor has a first direction of movement, and wherein the second controlled switching element is operable, when activated, to couple the electric motor to the power supply so that the electric motor has a second direction of movement which is opposite to the first direction of movement; and
    a control unit coupled to the single position sensor and the direction switching arrangement and configured, at each incremental amount of movement detected by the single position sensor, to determine a current position of the moving part based on a previous position thereof and the current direction of movement controlled by the direction switching arrangement, wherein the control unit is configured to determine the current direction of movement of the electric motor based on the activation of the first and/or the second controlled switching element.

2. The system according to claim 1, wherein the first and second controlled switching elements include a respective relay element.

3. The system according to claim 1, wherein the electric motor has a first supply input terminal and a second supply input terminal, between which a power supply signal ($V_s$) is applied for operation of the electric motor; and wherein the first and second controlled switching elements are operable to reverse the polarity of the power supply signal ($V_s$) to cause switching between the first and second direction of movement, and are further operable to cause stopping of the electric motor.

4. The system according to claim 1, wherein the position sensor is configured to provide a sensing signal (S) including a number of pulses, each pulse having a respective duration and being indicative of a detected incremental amount of movement.

5. The system according to claim 4, wherein the position sensor includes a magnetic Hall sensor operatively coupled to a magnetic ring arranged about a shaft coupled to the electric motor.

6. The system according to claim 4, wherein the control unit is configured to determine a current position of the moving part based on one or more of the following: the current, and a previous direction of movement controlled by the direction switching arrangement; the duration of the pulses of the sensing signal (S); and an operating status of activation or stopping of the electric motor.

7. The system according to any of claim 6, wherein the control unit, at each current pulse of the sensing signal (S) during operation of the electric motor, is configured to: increase or decrease a position count, based on the current direction of movement being a first direction of movement, or, respectively, a second direction of movement, opposite to the first direction of movement; and to store the current direction of movement as a last direction of movement in a memory; wherein the thereby increased or decreased, position count is indicative of the current position of the moving part.

8. The system according to claim 7, wherein the control unit is configured: to detect an obstruction of movement of the moving part; and, upon occurrence of the obstruction, to compare a duration of a current pulse to a duration of a previous pulse of the sensing signal (S), and to increase or decrease the position count, based also on the result of the comparison.

9. The system according to claim 7, wherein the control unit is configured: to detect stopping of the electric motor; and, upon stopping of the electric motor, to increase or decrease the position count, based also on the last direction of movement stored in the memory.

10. The system according to claim 9, wherein the control unit is configured: to determine, upon stopping of the electric motor, a normal stopping condition or a stall condition; and, in case of a normal stopping condition, to increase or decrease the position count in a way conform to the last direction of movement stored in the memory, and, in case of a stall condition, to increase or decrease the position count in a way opposite to the last direction of movement stored in the memory.

11. The system according to claim 1, wherein the electric motor is configured to generate a rotation movement, and the moving part is coupled to the electric motor to undergo a related linear movement along a first and a second, opposite, directions.

12. A window regulator for a vehicle, comprising an electric motor and a position determining system, according to claim 11; wherein the moving part is a window of a door of the vehicle.

13. A vehicle including the window regulator, according to claim 12.

14. A method for determining the position of a moving part driven by an electric motor, the method comprising:
   incrementally detecting an amount of movement of the electric motor by a single position sensor coupled thereto, wherein the position sensor is configured to provide a sensing signal (S) including a number of pulses, each having a respective duration and corresponding to a detected incremental amount of movement;
   providing an indication related to a current direction of movement of the electric motor, based on an operating status of a direction switching arrangement, configured to control a direction of movement of the electric motor;
   at each incremental amount of movement detected by the single position sensor, determining a current position of the moving part based on a previous position thereof and the current direction of movement controlled by the direction switching arrangement, wherein determining the current position of the moving part is based on one or more of the current and a previous direction of movement controlled by the direction switching arrangement, the duration of the pulses of the sensing signal (S), and an operating status of activation or stopping of the electric motor; and
   at each current pulse of the sensing signal (S) during operation of the electric motor, increasing or decreasing a position count based on the current direction of movement being a first direction of movement, or, respectively, a second direction of movement, opposite to the first direction of movement, and storing the current direction of movement as a last direction of movement in a memory, the thereby increased or decreased position count being indicative of the current position of the moving part.

15. The method according to claim 14, further comprising detecting an obstruction of movement of the moving part; and, upon occurrence of the obstruction, comparing a duration of a current pulse to a duration of a previous pulse of the sensing signal (S), and increasing or decreasing the position count, based also on the result of the comparison.

16. The method according to any of claim 14, further comprising detecting stopping of the electric motor; and, upon stopping of the electric motor, increasing or decreasing the position count, based also on the last direction of movement stored in the memory.

17. The method according to claim 16, wherein increasing or decreasing the position count, at each incremental amount of movement detected by the position sensor upon stopping of the electric motor, includes: determining a normal stopping condition or a stall condition of the electric motor; and, in case of a normal stopping condition, increasing or decreasing the position count in a way conform to the last direction of movement stored in the memory, and, in case of a stall condition, increasing, or decreasing, the position count in a way opposite to the last direction of movement stored in the memory.

* * * * *